United States Patent [19]
Jelich et al.

[11] Patent Number: 5,338,326
[45] Date of Patent: Aug. 16, 1994

[54] DEVICE FOR MONITORING FILTER COMPONENTS

[75] Inventors: Werner Jelich, Bochum; Heiko Rehwinkel, Bottrop; Friedrich Klauke, Ratingen; Dieter König, Hattingen; Udo Kalthoff, Mülheim/Ruhr, all of Fed. Rep. of Germany

[73] Assignee: Deutsche Babcock Energie- und Umwelttechnik AG, Oberhausen, Fed. Rep. of Germany

[21] Appl. No.: 87,575

[22] Filed: Jul. 2, 1993

[30] Foreign Application Priority Data

Aug. 7, 1992 [DE] Fed. Rep. of Germany ....... 4226144

[51] Int. Cl.$^5$ ............................................. B01D 46/04
[52] U.S. Cl. ............................................. 55/213; 55/302; 55/523
[58] Field of Search ..................... 55/213, 302, 523

[56] References Cited

U.S. PATENT DOCUMENTS

| | | | |
|---|---|---|---|
| 4,865,627 | 9/1989 | Dewitz et al. | 55/302 X |
| 5,094,673 | 3/1992 | Kilicaslan et al. | 55/302 |
| 5,094,675 | 3/1992 | Pitt et al. | 55/302 X |
| 5,242,472 | 9/1993 | Sellakumar | 55/302 X |

*Primary Examiner*—Charles Hart
*Attorney, Agent, or Firm*—Max Fogiel

[57] ABSTRACT

A device for monitoring the hollow filter components employed to filter hot and dusty gases. The components are grouped inside a filter housing (1). The components communicate through supply lines (9) with collectors (10). The collectors convey the filtered gas away. The line supplying each group accommodates a lance (15). The lance injects a fluid for sweeping the components clean. A transducer (16) downstream of the filter components detects the pressure of the filtered gas in the line. A change in pressure reveals a malfunction.

7 Claims, 2 Drawing Sheets

DEVICE FOR MONITORING FILTER COMPONENTS

BACKGROUND OF THE INVENTION

The present invention concerns a device for monitoring the hollow filter components employed to filter hot and dusty gases.

German OS 3 938 264 and European Exposure 0 433 637 disclose associating the ceramic tubes inside a filter group by group or row by row with the headers that convey the filtered gas away. The tubes rest on or are positioned under the headers. The headers are stacked along one or more planes throughout the cross-section of the filter and communicate with filtered-gas lines inside or outside the housing.

There is no way of monitoring the condition of the components or groups of components associated with the headers in known filters for cracks or obstructions for instance. The object of the present invention is a device for doing so.

SUMMARY OF THE INVENTION

The point of departure for the invention is that variations in the flow of filtered gas through the filter component express themselves as variations in the pressure of the filtered gas in the particular line. The pressure will increase for example when a component becomes defective or leaky and decrease when the component is obstructed. Both states can be detected by measuring the pressure exerted by the gas in the line. The results can then be interpreted as a signal to close off the header leading to the malfunctioning filter component.

BRIEF DESCRIPTION OF THE DRAWINGS

Embodiments of the invention will now be specified with reference to the drawing, wherein.

DESCRIPTION OF THE PREFERRED EMBODIMENTS

Figure 1:
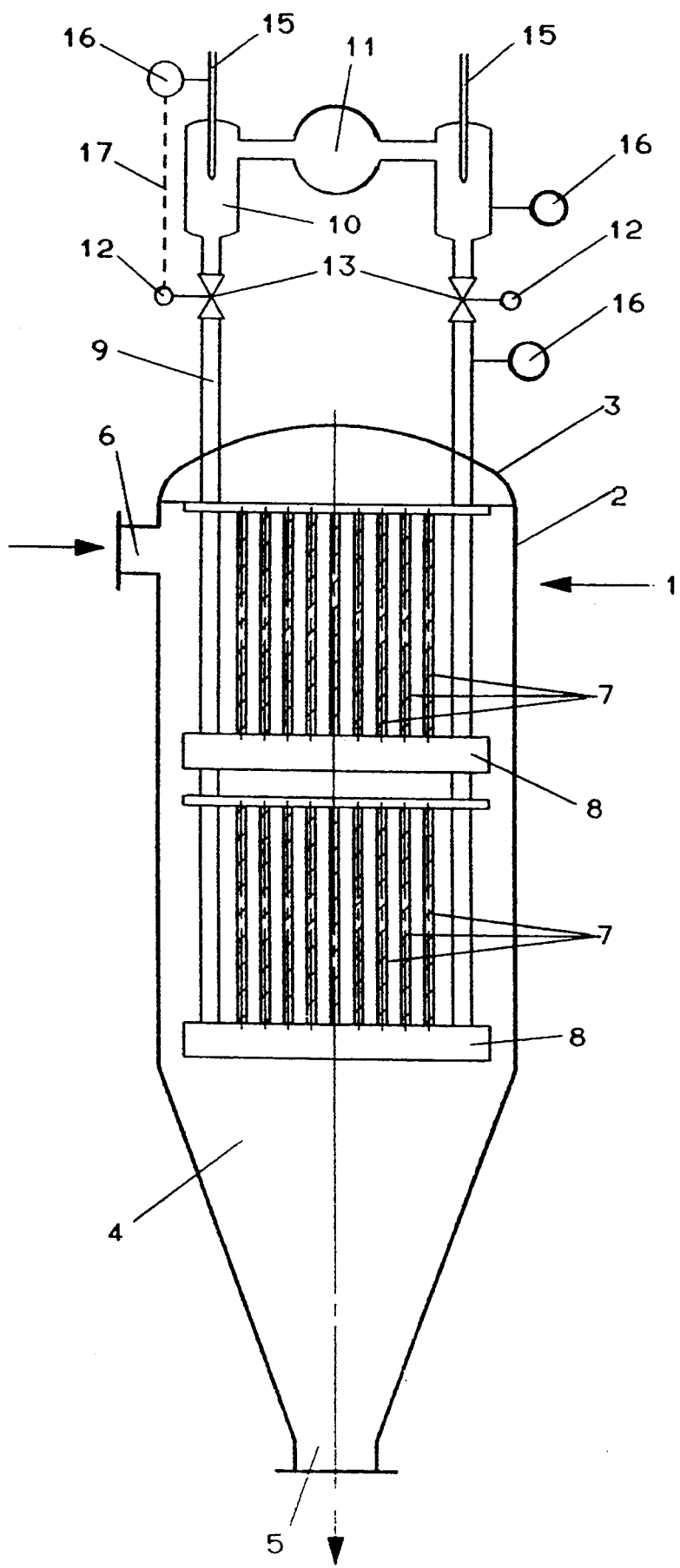
FIG. 1 is a schematic longitudinal section through a device for filtering gases and FIG. 2 is a schematic longitudinal section through another device for filtering gases.

A device for filtering preferably hot, dusty, and compressed gases consists of a housing 1 with a cylindrical wall 2, a vaulted top 3, and a hopper 4 to collect the precipitated dust at the bottom. Hopper 4 communicates with an outlet 5. Housing 1 also has an intake 6 for the dusty gas being filtered.

Housing 1 accommodates hollow filter components. Several components communicate with each header 8. The header collects the filtered gas and conveys it away. The components can be either hose sections or ceramic tubes 7 in the form of hollow masses closed off at one end. Every header 8 accepts gas from a group of tubes 7 that either rest on it on appropriate connections or are suspended from it. Headers 8 are positioned adjacent on one or more levels. The headers can for example rest on a ring secured to the wall 2 of housing 1 or be suspended in the housing above tubes 7.

Each header 8 communicates with a supply line 9. Each supply line 9 extends out of housing 1 to a collector 10. Collectors 10 communicate with a line 11 that conveys the filtered gas away. The remote section of every supply line 9 accommodates a valve 13 that can be opened and closed by an actuator 12.

Figure 2:
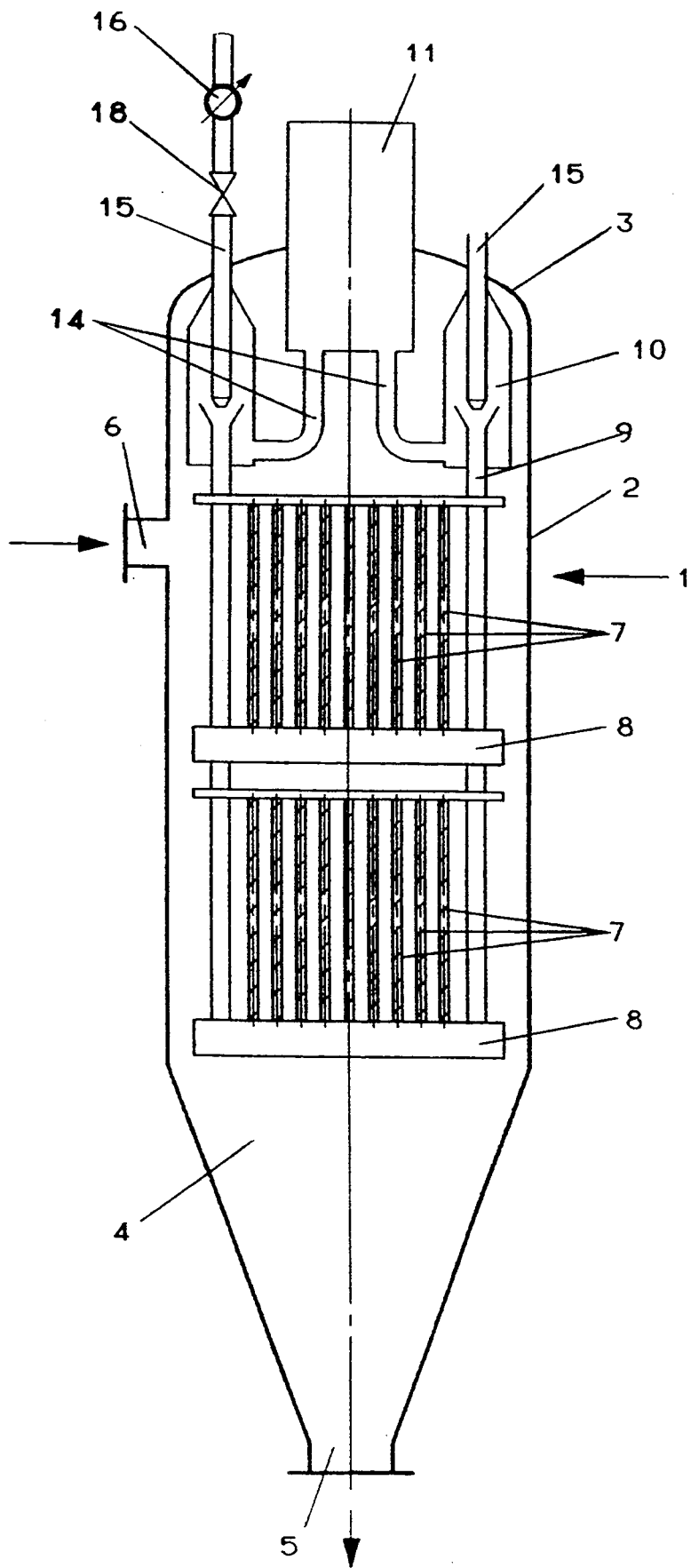

The collectors 10 that the supply lines 9 in the device for filtering hot and dusty gases illustrated in FIG. 2 open into are accommodated inside housing 1. Collectors 10 communicate with filtered-gas line 11 through branches 14. Filtered-gas line 11 extends out of housing 1.

Coaxial with each supply line 9 is a lance 15. Lance 15 extends into collector 10 and terminates above the mouth of supply line 9. The lance accommodates a valve 18. A gas can be injected into header 8 through lance 15 at a pressure above that of the dusty gas. The injected gas will shoot through filter tube 7 and lift the filter cake off its outer surface.

There is a pressure transducer 16 in the current of filtered gas. When the device is provided with supply lines that extend out of it individually, every supply line 9 or every collector 10 can accommodate a transducer 16, as illustrated in the right half of FIG. 1 by way of example. Transducer 16 cam be coupled with the actuator 12 that actuates valve 13 by way of a control line 17. It is preferable for transducer 16 to be accommodated in sweeper-injection lance 15. This design is particularly appropriate when the collector is accommodated inside housing 1.

A discrepancy between the pressure of the filtered gas detected in the line by a transducer 16 and an ideal stored in its memory means that one or more filter tubes 7 associated with that transducer is or are malfunctioning.

An upward discrepancy means that one or more tubes in the group is leaky or defective. In this event the supply of dusty gas to the group can be discontinued by closing valve 13 manually or automatically by way of line 17. In embodiments with interior collectors 10 the valve 18 in the associated sweeper-injection lance 15 can be closed manually or by transducer 16, upon which the accumulating cakes will soon completely clog tubes 7 up and allow no more gas through.

We claim:

1. An arrangement for monitoring hollow filter components which filter hot and dusty gases, comprising: a housing; collectors for conveying away filtered gas; supply lines connecting said collectors with said components inside said housing, said components communicating with said collectors through said supply lines; each group of components being supplied by a supply line having a lance injecting a fluid for sweeping the components clean; transducer means downstream of said filter components for detecting pressure of filtered gas in said supply line each group of filter components being individually monitorable by said transducer means, said pressure transducer means measuring selectively static pressure or total pressure of the filtered gas, a variation in filtered gas flow through said filter components producing a variation in total pressure of the filtered gas in a respective flow cross-section so that an increase in total pressure of the filtered gas behind a group of filter components designates that said group of filter components have become defective; a reduction in total pressure of the filtered gas behind a group of filter components designating that said group of filter components are clogged, pressure of the filtered gas for each group being measured individually.

2. An arrangement as defined in claim 1, wherein said transducer means is in every injecting lance.

3. An arrangement as defined in claim 1, wherein said transducer means is in every supply line.

4. An arrangement as defined in claim 1, wherein said transducer means is in every collector.

5. An arrangement as defined in claim 1, wherein said supply lines extend individually out of said filter housing and communicate with said collectors outside said housing; and communicate with said collectors outside said housing; valve means in each supply line outside said housing and controlled by said pressure transducer means.

6. An arrangement as defined in claim 1, including a filtered gas line communicating through said collectors with said supply lines inside said filter housing; and valve means in every said lance and controlled by said pressure transducer means.

7. An arrangement for monitoring hollow filter components which filter hot and dusty gases, comprising: a filter housing with said components grouped inside said filter housing; collectors for conveying away filtered gas; supply lines connecting said collectors with said components inside said housing, said components communicating with said collectors through said supply lines; each group of components being supplied by a supply line having a lance injecting a fluid for sweeping the components clean; transducer means downstream of said filter components for detecting pressure of filtered gas in said supply line each group of filter components being individually monitorable by said transducer means, said pressure transducer means measuring selectively static pressure or total pressure of the filtered gas, a variation in filtered gas flow through said filter components producing a variation in total pressure of the filtered gas in a respective flow cross-section so that an increase in total pressure of the filtered gas behind a group of filter components designates that said group of filter components having become defective; a reduction in total pressure of the filtered gas behind a group of filter components designating that said group of filter components are clogged, pressure of the filtered gas for each group being measured individually; said transducer means being in every injecting lance; said supply lines extending individually out of said filter housing and communicating with said collectors outside said housing; valve means in each supply line outside said housing and controlled by said pressure transducer means; a filtered gas line communicating through said collectors with said supply lines inside said filter housing; and valve means in every said lance and controlled by said pressure transducer means.

* * * * *